United States Patent Office 3,255,711
Patented June 14, 1966

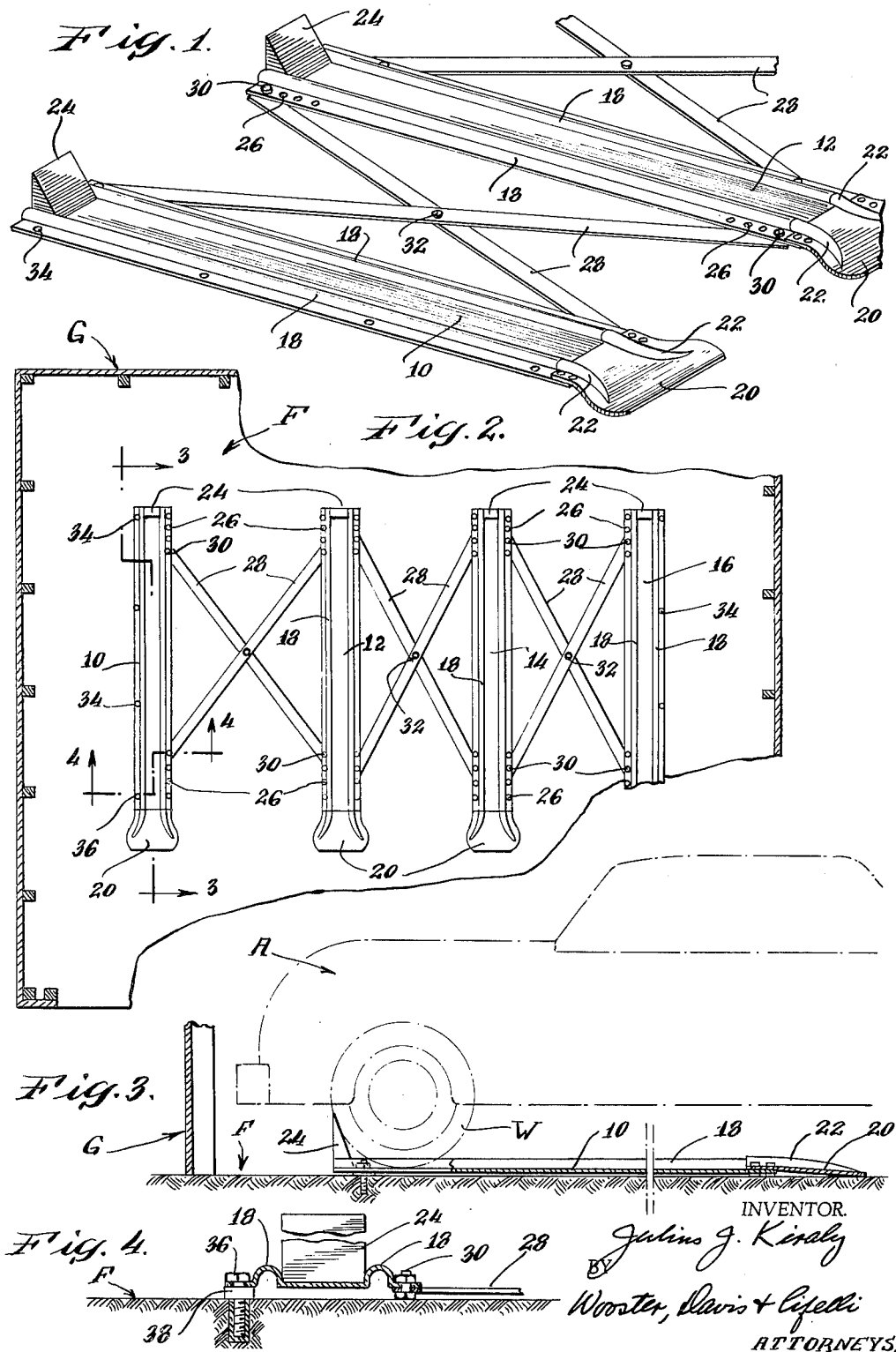

3,255,711
AUTOMOBILE POSITIONING GUIDE
Julius John Kiraly, 39 Windsor Road, Fairfield, Conn.
Filed July 31, 1964, Ser. No. 386,657
8 Claims. (Cl. 104—242)

This invention relates to an automobile positioning guide and, more particularly, to such a guide which is adapted to position a plurality of automobiles in predetermined locations relative to one another.

Many families now own more than one automobile. When these automobiles are parked in a single garage, they are often positioned improperly with respect to one another and with the walls of the garage. For example, if they are parked too close to each other or to the sides of the garage, damage to doors may result or insufficient space may remain for walking around the cars and for removing tools and implements from the garage. Furthermore, the track width of automobiles varies widely and many families own both a small car, having a narrow track, and a standard size car, having a much wider track. Furthermore, since automobiles are frequently replaced, an adjustable guide is necessary for maximum utility. It is also desirable that a separate guide be provided for each of a car's front wheels. However, the securing of a number of separate guides to a gargae floor would be a major undertaking, particularly in view of the relatively frequent changes in track width which can be anticipated.

Accordingly, it is the primary object of the present invention to provide an improved automobile positioning guide. Other objects are to provide such a guide which can be positioned on a garage floor with a minimum of fastening means; which is easily adjustable to the track width of various automobiles; which is easily adjustable to provide the desired space between automobiles; and which will accurately and automatically position a plurality of automobiles within a single enclosure.

The manner in which the foregoing objects are achieved will be more apparent from the following description, the appended claims and the figures of the attached drawing, wherein:

FIG. 1 is a perspective illustration of a portion of an automobile guide constructed in accordance with the invention;

FIG. 2 is a plan view of the guide of FIG. 1 shown positioned on the floor of a garage;

FIG. 3 is a cross section taken along line 3—3 of FIG. 2, illustrating the manner in which an automobile is positioned on the guide; and FIG. 4 is a cross section taken along line 4—4 of FIG. 2.

In accordance with the present invention, a plurality of wheel receiving guide tracks are adjustably secured to one another to form a unitary assemblage. The assemblage is secured to a garage floor to guide and position a plurality of automobiles in preselected positions.

In the drawings, there is illustrated a garage G having a floor F to which is secured the automobile guide of this invention. The guide consists of four positioning tracks, a left hand track 10, a left central track 12, a right central track 14, and a right hand track 16. The tracks are substantially identical but have certain dissimilarities which will be pointed out below.

Each track includes a central elongated base portion which is formed with a pair of raised ribs 18 extending its full length. The ribs 18 are positioned along the sides of the track to receive the automobile tire therebetween and to guide the front wheels of the automobile along the length of the corresponding track. As the guide is intended primarily for positioning the automobiles, it is not necessary that they be any longer than is required to engage and guide the front wheels of the car. A length of ten feet, for example, would be sufficient. The front end of each of the tracks is provided with a receiving apron 20 which may be bolted or otherwise secured to the end of the corresponding track and includes a pair of curved guide ribs 22 which mate with the ribs 18 and flare outwardly to receive the wheels of an oncoming car. The opposite end of each of the tracks is provided with a suitable bumper 24 for stopping the front wheel of the car at a predetermined point. Alternatively, bumper 24 may be extended high enough to engage the bumper of the oncoming automobile. A plurality of spaced positioning holes 26 is provided at the ends of the inner edges of tracks 10 and 16 and at the ends of both edges of tracks 12 and 14. The various tracks are related to one another by means of cross braces 28 which have their ends bolted to the proper holes 26 by means of bolts 30. Each pair of cross braces is secured together by means of a pivot member 32 which may be, for example, a rivet. It will thus be seen that the spacing between adjacent tracks may be easily adjusted by bolting the ends of the cross braces 28 to suitably selected holes 26. Thus, in the illustration of FIG. 2, the tracks 10, 12 are spaced at their maximum distance by connection of braces 28 to the innermost of the holes 26. Tracks 12, 14 and 16, on the other hand, are in closer spaced relationship by virtue of their cross braces 28 being connected to those positioning holes 26 which are spaced further apart along the edges of the tracks.

In addition to the holes 26 which are provided for positioning the tracks relative to one another, the left outer track 10 and the right outer track 16 are each provided with anchoring holes 34 spaced along their outermost edges. By means of these holes, the entire structure may be secured to the floor F of the garage—as, for example, by means of the bolts 36, as shown in FIG. 4, combined with leveling spacers 38. Because of the rigidity given the structure by virtue of the cross braces 28, only the two outer tracks need be bolted to the garage floor. It will also be apparent that the structure could be secured to the floor by bolting through any of the other track members.

In utilizing the positioning guide of this invention, an automobile A (FIG. 3) is driven into the garage with its front wheels aligned with the aprons 20 of the proper pair of tracks. As the front wheels W of the automobile roll onto the respective aprons, the sides of the tires are engaged by the guide ribs 22 which steer the wheels into alignment with the spaces between the ribs 18. At this point, the steering wheel of the automobile may be released and the automobile allowed to be automatically guided along the length of the selected pair of tracks until its front wheels W come in contact with the bumpers 24, stopping the car in the proper position. When leaving the garage, the procedure is reversed, the car being backed out until the front wheels clear the aprons 20, at which time the car may once again be steered by the driver.

It will be apparent that the present invention successfully achieves all of the objectives set forth above. Furthermore, it will be equally apparent that a number of variations and modifications may be made in this invention without departing from its spirit and scope. Accordingly, it is to be understood that the foregoing description is illustrative only, rather than limiting. This invention is limited only by the scope of the following claims:

What I claim as new and desire to secure by Letters Patent of the United States is:

1. An automobile positioning guide which comprises: first track means adapted to engage and guide therealong at least one front wheel of a first automobile; second track means adapted to engage and guide therealong at least one front wheel of a second automobile, each of said first and second track means defining a plurality of selectable first pivot points at corresponding adjacent first portions of said track means and at least a second pivot point at corresponding adjacent second portions of said track means; connecting bar means interconnecting a first pivot point of each track means with the second pivot point of the other track means; and stop means positioned on each of said track means to engage and halt said automobile at a predetermined location therealong.

2. The guide of claim 1 wherein each of said first and second track means comprises at least one elongated sheet metal track having thereon parallel guide ribs spaced to receive an automobile tire therebetween.

3. The guide of claim 2 wherein each of said tracks includes, at its receiving end, a tire receiving apron including spaced, non parallel receiving ribs converging to mate with said guide ribs.

4. The guide of claim 1 wherein said connecting bar means comprises first and second cross braces pivoted together at a point intermediate their ends and intermediate said first and second track means.

5. The guide of claim 1 wherein each of said first and second track means comprises: a pair of spaced parallel sheet metal tracks, each including parallel guide ribs spaced to receive an automobile tire therebetween; and spacing bar means interconnecting each pair of tracks.

6. The guide of claim 5 wherein each of said connecting bar means comprises first and second cross braces pivoted together at a point intermediate their ends and intermediate said first and second track means.

7. The guide of claim 6 wherein each of said spacing bar means comprises third and fourth cross braces pivoted together at a point intermediate their ends and intermediate each of said pair of tracks.

8. The guide of claim 7 wherein each of said tracks comprises an elongated sheet metal base having thereon parallel guide ribs spaced to receive an automobile tire therebetween.

References Cited by the Examiner
UNITED STATES PATENTS

| | | | |
|---|---|---|---|
| 878,135 | 2/1908 | Hastings | 104—44 |
| 1,753,550 | 4/1930 | Cook | 104—44 |

ARTHUR L. LA POINT, *Primary Examiner.*

F. W. MONAGHAN, *Assistant Examiner.*